Feb. 1, 1944. J. A. SCHMITT ET AL 2,340,297
MILKING APPARATUS
Filed Jan. 31, 1940
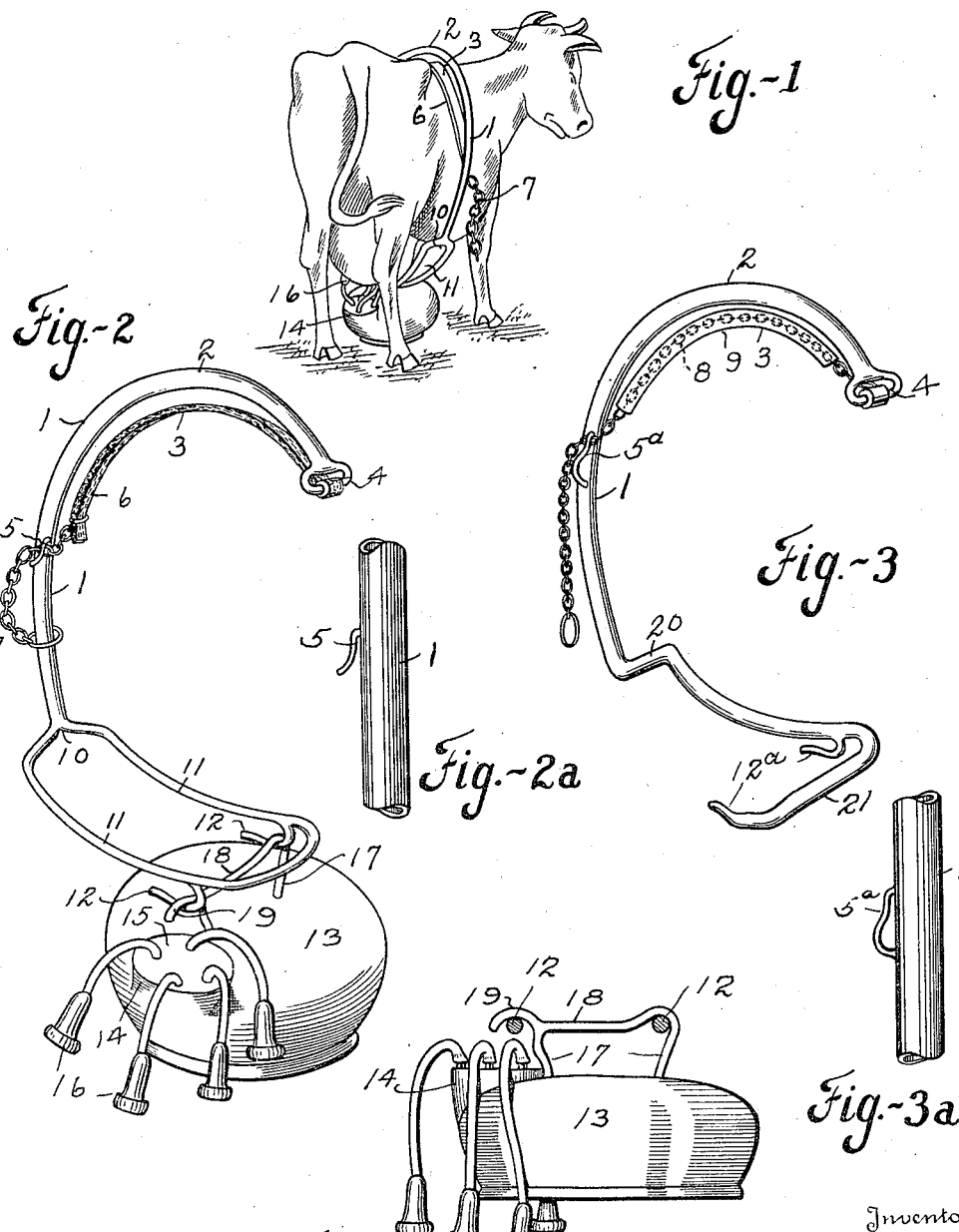
Inventors
John A. Schmitt
Lloyd S. Bender
By J. R. Walker
Attorney Patented Feb. 1, 1944

2,340,297

UNITED STATES PATENT OFFICE 2,340,297

MILKING APPARATUS

John A. Schmitt, Milwaukee, and Lloyd F. Bender, Waukesha, Wis., assignors to The Universal Milking Machine Company, Waukesha, Wis., a corporation of Wisconsin Application January 31, 1940, Serial No. 316,602

13 Claims. (Cl. 31—58)

This invention pertains to suspensory type milking apparatus wherein a milk receiver and teat cup cluster are supported upon the cow's back, and more particularly to a hanger or supporting rack with which the milk receiver and teat cup cluster are detachably engageable, and the suspension coupling therefor.

In the present device the hanger is capable of being easily and quickly applied to a cow from either side without the necessity of reaching under the animal or fastening a surcingle or other harness thereabout. The milk receiver is supported on a two point suspension, aligned fore and aft, which permits the receiver to always hang vertically, regardless of the position of the cow, which may stand with one hip or the other elevated, or may shift her stance from one leg to the other without materially changing the position of the receiver. Furthermore, the hanger is readily adjustable to cows of different size, and the receiver is easily engageable with and disengageable from the hanger.

The object of the invention is to provide a suspensory type milking apparatus which may not only be economically manufactured, but will be more efficient in use, stable in operation, capable of being easily and quickly applied, readily adjustable to cows of different size, and unlikely to get out of repair.

A further object of the invention is to improve the means and method of detachably suspending the milk receiver whereby it will maintain its upright position regardless of the stance of the cow.

A further object of the invention is to provide a suspensory hanger and coacting milk receiver bail having two point suspension thereon with which the receiver is readily disengageable.

A further object of the invention is to provide a suspensory hanger and a milk receiver mounted thereon for free swinging motion which will subject the teat cups and cow's teats to minimum strain and "strangulation."

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, wherein is shown the preferred but obviously not necessarily the only form of embodiment of the invention, Fig. 1 is a perspective view of a milch cow to which a milking apparatus embodying the present invention has been applied. Fig. 2 is a perspective view of the milking apparatus assembly removed from the cow. Fig. 2a is a detail view. Fig. 3 is a perspective view of a modified form of suspension unit. Fig. 3a is a detail view. Fig. 4 is a side elevation of the milk receiver.

Like parts are indicated by similar characters of reference throughout the several views.

The suspensory unit or hanger 1 is of substantially C shape and of rigid, preferably tubular, construction. The upper arcuate arm 2 of the hanger is adapted to extend across the cow's back and is provided with an adjustable saddle or flexible rest 3 comprising a chord of the arcuate arm 2, attached at one end to an eye 4 in the end of the hanger arm 2 and engaged at its opposite end with a keeper 5 on the hanger. To ease the engagement of the saddle 3 with the cow's back, the rest is preferably a flat strap 6 as shown in Fig. 2, with a chain extension 7, a selected link of which is engageable over or beneath the keeper hook 5. In lieu thereof, the rest chord or saddle may be a chain 8, upon which is strung a length of rubber hose 9 or other sheath to prevent chafing of the cow's back by the chain.

The lower arm of the C shaped hanger is bifurcated at 10 to form an arcuate loop 11 which extends beneath the cow. The sides of the loop 11 are disposed symmetrically with the plane of the hanger. Adjacent the extremity of the loop 11 and aligned substantially perpendicular to the plane of the hanger are a pair of hooks 12 upon which a milk receiver 13 is detachably engageable.

The milk receiver 13 may be of any suitable shape and construction. That illustrated is provided with a neck or spout 14 having a detachable closure lid 15. The milk tubes of a cluster of teat cups 16 communicate through the lid 15 with the interior of the receiver. The receiver 13 and teat cups 16 are operatively connected with a suitable suction means and pulsator mechanism as is customary.

The receiver 13 is provided with a bail comprising relatively spaced standards 17 and a transverse interconnecting bar 18 which is of slightly dependent arcuate form, thus affording at each end of the bail a slight upward identation in which the hooks 12 are engageable. One end of the bar 18 is preferably, although not necessarily, extended beyond the corresponding standard 17 in inverted arcuate form, at 19, for engagement with one of the hooks 12 of the hanger. When suspended as shown in Fig. 2, the receiver is free for to and fro oscillatory motion in a transverse direction. Thus, in the event the cow changes her stance, by shifting her weight from one leg to the other, the receiver will swing freely to maintain its upright position. The two point suspension, together with the shape of the bail, restrains the receiver from fore and aft movement and protects the teat cups and their connections from undue strain.

In the modified hanger shown in Fig. 3, in lieu of the loop 11, the stem of the hanger 1 is bent laterally at 20 to one side of the plane of the hanger and is reversely bent at its extremity to form the transverse arm 21 extending equally in opposite directions beyond the plane of the hanger. Hooks 12a at each end of the transverse terminal arm 21 engage the bail of the receiver 13 which is supported thereon, in the same balanced relation relative to the plane of the hanger and free thereon for lateral swinging motion as before described.

While various forms of detents or keepers for the saddle 3 may be used, two simple forms have been shown in Figs. 2a and 3a. In the former there is shown a simple hook 5 attached to the stem of the hanger and engageable in a link of the chain 7. To restrain the end of the chain a terminal ring thereof surrounds the hanger stem and slides thereon. In Fig. 3a there is shown a keeper loop 5a of tapered form into the narrow end of which a chain link may be engaged.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a suspensory type milking apparatus, a substantially C shaped hanger engageable over the back of a cow, a flexible rest forming a chord of the arcuate top of the C shaped hanger and adjustably engageable therewith, a pair of supporting hooks carried by the lower portion of the C shaped hanger disposed in relatively spaced relation, in a fore and aft axial plane thereof, a milk receiver, and a bail therefor having relatively spaced indentations for engagement of the hooks, the receiver being free thereon for to and fro swinging motion in the plane of the hanger.

2. In a suspensory milking apparatus, a substantially C shaped hanger engageable over a cow's back, a saddle rest therefor comprising a flexible strand attached adjacent the extremity of the upper arcuate portion of the C shaped hanger and adjustably engageable with the stem of the hanger in spaced relation with the extremity thereof, a milk receiver, and a detachable coupling between the lower portion of the C shaped hanger and the receiver.

3. In a suspensory milking apparatus, a hanger member including interconnected laterally extending vertically spaced upper and lower arms, the upper arm of which is engageable over a cow's back, with the lower arm extending underneath the cow, a milk receiver, and a bail therefor with which the lower arm of the hanger has engagement at relatively spaced fore and aft points aligned substantially perpendicular to the plane of the hanger, the receiver being free for swinging motion parallel to the plane of the hanger.

4. In a suspensory type milking apparatus, a hanger including interconnected upper and lower arms, the upper arm being positionable over a cow's back, with the lower arm extending underneath the cow's belly, and a milk receiver suspended on the lower arm for to and fro lateral swinging motion transversely of the cow substantially parallel with the plane of the hanger.

5. In a suspensory type milking apparatus, a hanger including interconnected upper and lower arms, the upper arm being positionable over a cow's back, with the lower arm extending beneath the cow's belly, said lower arm being bifurcated, a milk receiver, and coupling means for suspending the milk receiver simultaneously upon the respective furcations of said arm, for oscillatory motion transversely of the cow and substantially parallel with the plane of the hanger.

6. In a suspensory type milking apparatus, a hanger including interconnected upper and lower arms, the upper arm being positionable over a cow's back, with the lower arm extending beneath the cow's belly, a pair of suspension hooks carried by the lower arm in fore and aft relatively spaced relation at opposite sides of the plane of the hanger, a milk receiver, and a bail therefor detachably engageable with the suspension hooks for transverse swinging motion of the milk receiver.

7. In a suspensory type milking apparatus, a hanger including interconnected upper and lower arms, the upper arm being positionable over a cow's back, with the lower arm extending beneath the cow's belly, a milk receiver, and a bail therefor detachably engageable with the lower arm of the hanger at relatively spaced points for free swinging motion in one direction only transversely of the cow and substantially parallel with the plane of the hanger.

8. In a suspensory type milking apparatus, a hanger including interconnected upper and lower arms, the upper arm being positionable over a cow's back, with the lower arm extending beneath the cow's belly, a milk receiver suspended upon the lower arm and a saddle rest adjustably connected with the hanger and extending in spaced relation with the upper arm for direct supporting engagement with the cow's back.

9. In a suspensory type milking apparatus, a hanger including interconnected upper and lower arms, the upper arm being positionable over a cow's back, with the lower arm extending beneath the cow's belly, a milk receiver suspended on the lower arm and a saddle rest comprising a flexible strip of material interconnecting the upper arm with the portion of the hanger intermediate the upper and lower arms having its medial portion spaced therefrom for direct supporting engagement with the cow's back.

10. In a suspensory type milking apparatus a milk receiver including a vessel, a pair of spaced standards carried thereby, a transverse suspension bar interconnecting the standards with at least one end projecting therebeyond, and a hanger simultaneously engageable with the bar intermediate the standards and with the end of said bar projecting beyond a standard.

11. A milk receiver, a bail therefor comprising relatively spaced standards and a transverse bar interconnecting the standards, including a projecting end beyond one of said standards constituting a connection to which a milking apparatus suspension device may be attached.

12. In a suspension type milking apparatus, a hanger engageable over a cow's back, including a bifurcated portion which projects beneath the cow's belly, a milk receiver suspended on said furcations, and coupling means for interengaging the hanger and receiver on a fore and aft axis for oscillatory motion transversely of the cow.

13. In a suspension type milking apparatus, a single hanger member engageable over a cow's back including a portion projectable beneath the cow's belly, a milk receiver detachably engageable therewith and a two point suspension coupling for engaging the milk receiver with the hanger for free oscillatory motion on a fore and aft axis transversely of the cow.

JOHN A. SCHMITT.
LLOYD F. BENDER.